US006569487B2

(12) United States Patent
Villard

(10) Patent No.: US 6,569,487 B2
(45) Date of Patent: May 27, 2003

(54) FRUIT AND VEGETABLE PROCESSING METHOD

(75) Inventor: Jean Villard, Bouge-Chambalud (FR)

(73) Assignee: Jean Villard (SARL), Bouge-Chambalud (FR)

( * ) Notice: Subject to any disclaimer, the term of this patent is extended or adjusted under 35 U.S.C. 154(b) by 0 days.

(21) Appl. No.: 10/108,068

(22) Filed: Mar. 27, 2002

(65) Prior Publication Data

US 2002/0119242 A1 Aug. 29, 2002

Related U.S. Application Data

(63) Continuation of application No. PCT/FR00/02511, filed on Sep. 12, 2000.

(30) Foreign Application Priority Data

Sep. 29, 1999 (FR) .............................. 99 12423

(51) Int. Cl.[7] .............................. A23L 1/212; A23C 7/08
(52) U.S. Cl. .................. 426/639; 426/306; 426/660
(58) Field of Search ................. 426/639, 306, 426/660

(56) References Cited

U.S. PATENT DOCUMENTS

| | | | | |
|---|---|---|---|---|
| 1,560,396 A | * | 11/1925 | Nararre | 426/639 |
| 1,717,258 A | * | 6/1929 | Rambaud | 426/639 |
| 3,032,419 A | * | 5/1962 | Limbert | 426/639 |
| 3,365,309 A | * | 1/1968 | Pader et al. | 426/639 |
| 4,307,126 A | | 12/1981 | Sano et al. | 426/660 |
| 4,713,252 A | | 12/1987 | Ismail | 426/290 |
| 4,837,042 A | | 6/1989 | Vajda et al. | 426/615 |
| 4,880,648 A | * | 11/1989 | Stamer | 426/639 |

FOREIGN PATENT DOCUMENTS

| | | |
|---|---|---|
| CH | 661410 | 7/1987 |
| DE | 400678 | 9/1991 |
| EP | 0241392 | 10/1987 |
| EP | 0382656 | 8/1990 |
| EP | 0483012 | 4/1992 |
| FR | 2705205 | 11/1994 |

OTHER PUBLICATIONS

Zhou et al., "Making Method of Chockolate Candied Fruits", CN1075608 (Sep. 1, 1993)(English abstract only).

* cited by examiner

*Primary Examiner*—Helen Pratt
(74) *Attorney, Agent, or Firm*—Heslin Rothenberg Farley & Mesiti P.C.

(57) ABSTRACT

The invention concerns a method for processing vegetable products comprising an aqueous fraction, for producing vegetable-based foods. The invention is characterized in that it consists in: arranging vegetable products and crystallized sugar in a chamber, the weight of sugar representing at least 20% of the vegetable product weight; allowing the sugar to flow by gravity inside the chamber around the vegetable products, while maintaining the chamber at a temperature not higher than room temperature; recirculating the sugar which has flowed to the base of the chamber, so as to ensure that it is constantly circulated around the vegetable products and that the sugar is absorbed by the vegetable products, and that part of the aqueous fraction of the vegetable products is eliminated.

12 Claims, No Drawings

FRUIT AND VEGETABLE PROCESSING METHOD

Cross Reference to Related Applications

This application is a continuation of PCT application PCT/FR00/02511 filed Sep. 12, 2000 designating the United States, and published in French as WO 01/22827 on Apr. 5, 2001. PCT/FR00/02511 claimed the priority of French application FR 99/12423 filed Sep. 29, 1999. The entire disclosures of both are incorporated herein by reference.

TECHNICAL FIELD

The invention relates to the food industry sector. It relates more precisely to a novel method allowing the processing of plant products and in particular of fruits, vegetables, mushrooms and aromatic herbs, enabling preservation of these plant products without any chemical, natural or artificial additive. The fruits and vegetables obtained by this method, and the purees produced from these fruits, or the liquid extracts obtained during the method have multiple uses, in particular in relation to chocolate.

In the remainder of the description, the method is essentially described in its application to the processing of fruit, but it may be transposed for numerous other types of plant products.

PRIOR ART

As is known, fruits are frequently used in numerous food preparations, in particular in confectionery, in which they are often combined with chocolate.

More precisely, to manufacture fresh fruit coated with chocolate, it is essential to incorporate a fraction of crème fraîche or of another fatty substance into the chocolate, so that the mixture adheres to the fruit. It is quite obvious that the use of a fatty substance involves very demanding preservation conditions.

Moreover, to obtain good adhesion of the chocolate to the fruit, it is also possible to coat it with a layer of sugar and/or starch to which the chocolate adheres. Unfortunately, this method modifies the taste of the confectionery by making it more sweet, and requires an additional operation which will extend the manufacturing time.

At present, the only technique known for causing chocolate to adhere to a fruit consists in using fruits previously impregnated with alcohol, which substantially limits the range of products which can be produced. At present, "direct" adhesion of chocolate to a fruit can only be achieved after having impregnated the fruit with alcohol. Only Morello cherries, raspberries and a few other fruits are currently processed in this way.

The first problem which the invention therefore proposes to solve is that of the possibility of combining fresh fruit or pieces of fruit with chocolate, without adding any additive or intermediate agent.

Moreover, if it is desired to incorporate a fraction of fruit purée to chocolate in order to produce a spread, it is necessary to add to the mixture a fraction of crème fraîche or of a fatty substance, which has the abovementioned disadvantages.

Furthermore, the quantity of fruit purée which can be incorporated will be limited by concerns about preservation over time. Indeed, in the absence of preservative, it is impossible to obtain fruit purée/chocolate mixtures containing more than 10% of fruit, without the risk of molds appearing.

The second problem which the invention therefore proposes to solve is the possibility of increasing this proportion of fruit purée which can be incorporated into chocolate.

In general, the incorporation of whole fruits or of fruit purée into milk foods is of great interest (manufacture of fruit yogurt for example). However, for preservation considerations, it is necessary that the fruits used on the production line for these products are treated beforehand. This may be carried out by chemical treatment or preservation methods, or even a combination of both.

By way of example, and as described in patent EP 327 543, fruits can be subjected to different stages of a process intended to ensure their good preservation. More precisely, as described in the abovementioned document, the fruits are mixed with granulated sugar so as to increase the sugar content of the fruits while heating.

Such a heating is particularly damaging since it tends to degrade and soften the fruit, and therefore to reduce its capacity to absorb sugar. Moreover, the vigorous mixing, mentioned above, which unavoidably causes the crushing of the fruits, reinforces their inability to absorb an additional quantity of sugar. This method therefore requires the addition of specific chemical products such as citrates or other acidifying agents, intended to enable the preservation of the products.

Another problem which the invention therefore seeks to solve is to enable a practically perfect preservation of the fruits, without adding any chemical, natural or artificial additive, in order to allow the incorporation of the fruits into numerous food preparations.

In the document U.S. Pat. No. 4,713,252, there is described a method for processing bilberries in order to produce a purée having enhanced taste qualities. According to this method, the bilberries are immersed in a vessel containing granulated sugar. The bilberries are kept inside this vessel for several hours, while undergoing heating. An osmotic phenomenon occurs between the bilberries and the sugar in which they are placed. The heating undergone by the fruits causes the abovementioned disadvantages, namely softening of the fruit, and therefore a reduction in its capacity to absorb sugar.

The invention therefore proposes to provide a novel method for processing fruits which allows optimum preservation thereof without the use of any chemical, natural or artificial product, the fruits thus obtained being easily incorporated into many food preparations, and in particular some which include chocolate.

DISCLOSURE OF THE INVENTION

The invention therefore relates to a method for processing plant products comprising an aqueous fraction, in particular for the production of foods based on such plant products.

This process is characterized in that it consists:

in placing plant products and granulated sugar in a chamber, the weight of sugar representing at least 20% of the weight of plant products;

in allowing the sugar to flow by gravity inside the chamber around the plant products, while maintaining the chamber at a temperature of less than or equal to room temperature;

recirculating the sugar which has flowed to the bottom of the chamber, so as to ensure that it is constantly circulated around the plant products and that the sugar is absorbed by the plant products, and that part of the aqueous fraction of the plant products is exuded.

In other words, the invention consists in bringing the plant products into contact with solid sugar, such that a large portion of the water contained in these plant products comes out therefrom, and is present in the solid sugar, and that, conversely, part of the granulated sugar penetrates into the plant product.

The expression sugar is understood to mean granulated sugar such as sucrose, but also fructose, dextrose, or any other type of solid sugar. The expression plant products is understood to mean fruits, vegetables, as well as mushrooms, and aromatic herbs, flowers, flowering tops and more generally the plant products used as food in a broad sense.

Thus, using the method in accordance with the invention, the amount of plant product product dry extract is very substantially increased. The contact is maintained until there is complete absorption of the sugar, that is to say up to the moment the plant material is saturated with sugar and no longer absorbs it.

Such a method therefore makes it possible to obtain a liquid fraction consisting of sugar dissolved in the juice of the plant product corresponding to the aqueous fraction extracted from the plant product, and in which the treated plant products are immersed.

It is therefore possible, depending on the desired applications, to extend the method by separating the liquid fraction and the treated plant product, or by grinding the treated plant product alone or with part of the liquid fraction.

Surprisingly, it has been observed that by carrying out the operation in accordance with the invention, the amount of fructose and glucose present inside the fruit (or more generally the plant products) is much higher than that measured in natural fruits, whereas the added sugar is sucrose. Thus, the method in accordance with the invention appears to result in a chemical conversion of the sugar used.

In a particularly surprising manner, it is observed that the fruits treated, when they are separated from the liquid fraction, exhibit an excellent preservation capacity, and that they can be preserved in an ambient atmosphere for several days, or even several weeks, without undergoing any degradation. This is found to be particularly advantageous for many applications, using mellow or dried fruits.

In practice, it was observed that the preservation was particularly enhanced when the weight of sugar represents between 80 and 120% of the weight of plant products.

Also surprisingly, it was observed that the treated fruits had a very good capacity to be mixed directly with chocolate, without requiring the addition of any foreign fatty substance, of which the disadvantages were specified above.

Advantageously, the fruits and vegetables used (and more particularly the plant products) may be whole fruits or vegetables as well as precut or presliced fruit or vegetables.

The fruits and vegetables may be fresh or may have been previously subjected to a freezing stage.

In practice, avoid possible problems relating to the fermentation of the fruits, it may prove advantageous to maintain said chamber at a temperature of less than 6° C. For some fruits, and in particular for pears, it may prove advantageous to work at a lower temperature, of between −5 and −10° C.

Advantageously in practice, the chamber may also be maintained under a reduced pressure, so as to limit the quantity of oxygen capable of causing fermentation phenomena.

Several techniques may be used for maintaining the flow of the sugar around the fruit, and to ensure constant circulation as the sugar is absorbed.

Thus, in practice, in a first embodiment, it is possible to modify the inclination of the chamber relative to the vertical, so that the fraction of the sugar which has flowed to the bottom rises to the upper part of the chamber. In this manner, the rise of the slightly impregnated sugar is brought about, so as to allow it again to trickle over the fruits.

In a second embodiment, it is possible to ensure the rise of the sugar via a pumping system, which collects the sugar which has flowed to the bottom of the chamber, and which reinjects this fraction of soaked sugar at the top part of the chamber. In this embodiment, the chamber remains fixed and causes no movement of the fruits throughout the process.

In another embodiment, it is possible to mechanically mix the fruits inside the chamber by the action of a paddle or of an equivalent means. This solution leads to a result of less satisfactory quality for certain types of fruits, since the latter are then subjected to mechanical stress which can cause their degradation, and consequently poor absorption of the sugar.

The invention also relates to the treated fruits which can be obtained according to the method, as well as the fruit purée produced from these fruits. Such a purée can therefore be advantageously combined with chocolate for the production of unctuous spread or of chocolate filling, or of chocolate and fruit truffles.

The invention also relates to the liquid fruit extract obtained after the separation of the liquid fraction collected at the end of the process.

The manner of carrying out the invention as well as the advantages resulting therefrom will emerge clearly from the description of the embodiments which follow.

MANNER OF CARRYING OUT THE INVENTION

As already stated, the invention relates to a method for processing plant products, and more particularly fruits, which makes it possible to obtain fruits exhibiting excellent preservation capacity, without any addition of chemical products and preservatives, and the like, and which exhibit, in addition, good capacity to be incorporated into many food preparations, such as in particular those including chocolate.

EXAMPLE NO. 1

By way of example, the method in accordance with the invention was used to process strawberries, and more precisely of the "Elsenta" variety.

Thus, in practice, fifty kilos of strawberries of the above-mentioned variety are placed in a chamber having a volume in the region of 120 liters with fifty kilos of crystal sucrose. More precisely, the introduction into the chamber is made by closely packing successive layers of strawberries and of sugar.

When the chamber is full, it is closed, removing as much as possible the air present in the chamber, in particular in order to avoid and limit as much as possible the possible fermentation phenomena.

This chamber is then inverted approximately every three hours, so that the sugar which has become soaked with water derived from the strawberries has started to flow into the bottom of the chamber by gravity.

The inverting operation is repeated at regular intervals, of the order of three hours, for four to five days.

As the process progresses, the sugar becomes more and more liquid, and the chamber inverting operations can be made at shorter intervals.

Depending on the fruits used and the final texture desired, the operations may be different. Thus, it is possible to reduce the time between inversions down to fifteen minutes if it is desired to obtain a result which is closer to a purée.

Subsequently, the liquid fraction is extracted from the chamber by any appropriate means, and in particular by a discharge orifice equipped with a tap.

Subsequently, the chamber is opened and the strawberries which it contains are placed in air in order to dry them.

It is observed that the strawberries thus obtained comprise a dry extract level in the region of 54%, whereas before carrying out the process, their dry extract was in the region of 10%. The external appearance of the strawberries is practically identical to that of the strawberries before their processing. Moreover, the liquid fraction collected has a sugar level of the order of 47 to 48 brix, whereas the strawberry has a level of 55 to 56 brix.

EXAMPLE NO. 2

The method in accordance with the invention was also carried out to treat raspberries of the "Heritage" variety, in the same portion of sugar as in the abovementioned example, and fruits were obtained which have a dry extract level also of the order of 54%.

Other Examples

Under the same operating conditions, the method in accordance with the invention also gave excellent results for the processing of numerous other fruits, and in particular lemon, orange, melon, apricot, blackcurrant, Morello cherry, quince, fig, apple and pineapple, in which the natural dry extract level extends over a relatively wide range.

Using the same method, vegetables and the like, such as potatoes, carrots, olives, tomato and mushrooms, were also processed.

The method also gives good results on flowers such as roses, or more generally on flowering tops such as linden, and on aromatic herbs. For the latter, extracts particularly rich in flavorings are obtained.

The fruits thus obtained may be used in numerous applications, and in particular, and nonexhaustively:
spreads containing a fruit fraction;
fruit jellies;
fruit or vegetable sauce bottoms, optionally containing a fraction of salt, and obtained for example for fruits such as figs and blueberries, redcurrants and blackcurrants, or for vegetables such as carrots, olives, tomatoes, mushrooms or even aromatic herbs such as mint;
fruit preparations for pastries;
fruit pieces intended to be incorporated into milk foods such as yogurts, with a proportion of fruit which may be very markedly higher than that commonly used for traditional yogurts;
jams and jellies containing whole fruits or fruit pieces;
fruit preparations intended to be incorporated into "chantilly"-type creams, in particular packaged in pressurized cans;
"fruit salad"-type fruit mixtures. For this application, it is possible to carry out the mixing of the fruits and sugar in containers or jars in which the method is carried out, and which will then be marketed.

The fruit pulp obtained in accordance with the invention may also be incorporated into:
preparations for producing sorbets;
preparations intended for filling chocolate bars;
pastries.

Moreover, the fruit extract corresponding to the liquid fraction obtained at the end of the method may be used in a large number of the abovementioned applications, and also in combination with drinks with or without alcohol, and in particular as a mixture with wines or spirits.

As already stated, the invention finds application most particularly for the production of fruit preparations combined with chocolate.

There may be mentioned:
the production of whole fruits steeped in chocolate, such as strawberries, grapes, Morello cherries, and the like;
fruit sorbets incorporating a chocolate fraction, without it being necessary to add any fatty substance;
preparations mixing fruit and chocolate, and intended to be incorporated into milk or water for drinks;
fruit jellies incorporating a chocolate fraction.

It is evident from the above that the method in accordance with the invention, and the various products capable of being obtained by this method, have many advantages, and in particular:
a very large number of uses,
an excellent preservation without any particular precaution,
a complete absence of special additive or preservative,
the maintenance of quality present in fresh fruit such as the color, the resistance and the taste quality of the fruit. Indeed, the sugar present in fruits serves as taste enhancer, without conferring, unlike candied fruits, an excessively sweet taste which masks the natural fruit taste,
economic ease of carrying out the method.

What is claimed is:

1. A method for processing a plant product comprising an aqueous fraction, for the production of food based on the plant product, wherein the method comprises:
    (a) placing the plant product and granulated sugar in a chamber, the weight of the sugar representing at least 20% of the weight of the plant product;
    (b) allowing the sugar to flow by gravity inside the chamber around the plant product, while maintaining the chamber at a temperature of less than or equal to room temperature, and while maintaining the chamber at a pressure below ambient pressure; and
    (c) recirculating the sugar which has flowed to the bottom of the chamber, so as to ensure that it is constantly circulated around the plant product, wherein at least a portion of the sugar is absorbed by the plant product to form a treated plant product, and that part of the aqueous fraction of the plant product is exuded.

2. The method of claim 1, wherein the plant product used is selected from the group consisting of whole fruit, whole vegetables, cut fruit, cut vegetables, presliced fruit, and presliced vegetables.

3. The method of claim 1, wherein the plant product used is selected from the group consisting of fresh fruit, fresh vegetables, fruit which has been previously subjected to a freezing stage, and vegetables which have been previously subjected to a freezing stage.

4. The method of claim 1, wherein the chamber is maintained at a temperature of less than 6° C.

5. The method of claim 1, wherein the weight of the sugar is between 80 and 120% of the weight of the plant product.

6. The method of claim 1, further comprising after step (c), the step of (d) separating a liquid fraction from the treated plant product, wherein the liquid fraction comprises the unabsorbed sugar which is dissolved in the exuded aqueous fraction of the plant product.

7. The method of claim 6, wherein the treated plant product is fruit, and wherein the method further comprises after step (d), the step of coating the treated fruit with a chocolate coating.

8. The method of claim 6, further comprising after step (d), the step of (e) grinding the treated plant product alone or with part of the liquid fraction.

9. The method of claim 8, wherein the treated plant product is fruit, and wherein the method further comprises after step (e), the step of (f) mixing the ground fruit with chocolate in order to obtain a spread.

10. The method of claim 1, wherein the sugar which has flowed to the bottom of the chamber is recirculated by modifying the inclination of the chamber relative to the vertical.

11. The method of claim 1, wherein the sugar which has flowed to the bottom of the chamber is recirculated by pumping to and reinjecting at the top part of the chamber.

12. The method of claim 1, further comprising after step (c), the step of incorporating the treated plant product into a food product.

* * * * *